12-17-74 OR 3,855,614

SR

United States Patent [19]

Okada

[11] 3,855,614

[45] Dec. 17, 1974

[54] BEAM CURRENT CONTROL SYSTEM FOR A PICTURE TUBE

[75] Inventor: Takashi Okada, Yamato, Japan

[73] Assignee: Sony Corporation, Tokyo, Japan

[22] Filed: Dec. 22, 1972

[21] Appl. No.: 317,730

[30] Foreign Application Priority Data

Dec. 24, 1971 Japan .................................. 46-2587

[52] U.S. Cl. ............................. 358/74, 178/7.5 DC

[51] Int. Cl. .............................................. H04n 9/16

[58] Field of Search ...... 178/5.4 R, 5.4 BT, 7.5 DC; 358/74

[56] References Cited

UNITED STATES PATENTS 2,910,533 10/1959 Fisher........................... 178/7.5 DC 3,062,914 11/1962 Fernald et al.................. 178/5.4 BT 3,465,095 9/1969 Hansen et al. .................. 178/5.4 R 3,598,913 8/1971 Janssen ........................ 178/7.5 DC

*Primary Examiner*—Richard Murray

*Attorney, Agent, or Firm*—Hill, Gross, Simpson, Van Santen, Steadman, Chiara & Simpson

[57] ABSTRACT

A beam current control system for a television picture tube where the chrominance signal is applied to the cathode which includes applying a pulse to the control electrode to cut off the picture tube and deriving a control signal in response to the difference between the potential of the cathode during the blanking interval and a reference potential developed at the cathode when the picture is cut off, and using the control signal to set the minimum beam current at a desired predetermined minimum level.

6 Claims, 19 Drawing Figures

BEAM CURRENT CONTROL SYSTEM FOR A PICTURE TUBE

BACKGROUND OF THE INVENTION

1. Field of the Invention

This invention relates to a beam current control system for maintaining a minimum beam current of a television picture tube or the like always of a constant value.

2. Description of the Prior Art

Recently, many television receivers have employed circuits which are integrated and direct-coupled. This use has included the driving circuit of a picture tube. In a transistorized direct-coupled circuit, however, the direct current level of the video image signal during blanking interval applied to the picture tube should be adjusted to a predetermined value in consideration of the static characteristic of the picture tube. This adjustment is made in the manufacturing process by setting the operating point of the driving circuit in accordance with the pedestal level during the blanking interval of the video signal being applied to the picture tube, because the video signal is formed based on the pedestal level. In this case, however, even once it has been adjusted, it should be noted that transistors used in the driving circuit are extremely sensitive to temperature which results in a change in their operating point. It is also noted that the picture tube itself is deteriorated in emission efficiency due to its secular variation. Accordingly, a re-adjustment is required. Further, in a color picture tube, its temperature characteristic and the adjustment of direct current level should be considered with respect to all three systems for the unbalance of three circuit systems of color demodulator circuit will be appreciable. Because the color picture tube has a problem of white balance, if the three systems are unbalanced, a color image can not be correctly expressed.

In the prior art, U.S. Pat. No. 3,558,817, a system is disclosed in which a beam current is directly measured and adjusted in response to its variation, so that the video signal can be supplied only to its grid electrode. However, in the picture tube, the level of the signal for driving a grid electrode must be larger than that for driving a cathode electrode, and hence when the grid electrode is driven, a high voltage-proof transistor is necessary as an output transistor. Particularly, in a color picture tube, three color systems have to be provided with high voltage-proof devices. This is a great disadvantage when such systems are transistorized and further integrated.

SUMMARY OF THE INVENTION

The present invention provides a novel means for maintaining a predetermined minimum level of the beam current of a television picture tube by applying a sampling pulse to the grid electrode of a television picture tube to cut the picture tube off, deriving a control signal from the difference between the potential of the cathode electrode during the blanking interval of the picture tube and a reference potential developed at the cathode electrode when the tube is cut off, and varying the cathode bias in response to variation of this control signal.

In the present invention, a pulse which is sufficiently strong to cut off a picture tube is adapted to be applied as a sampling pulse to the grid electrode of the picture tube. In this case, a control signal is obtained in accordance with the variation of potential at the cathode electrode of the picture tube to control a minimum beam current, thus avoiding the previously described defect.

Accordingly, a main object of this invention is to provide a novel beam current control system.

Another object of this invention is to provide a novel beam current control system for a picture tube having a direct-coupled driving circuit.

A further object of this invention is to provide a novel beam current control system suitable for use in a color television receiver.

A still further object of this invention is to provide a novel beam current control system suitable for use in an integrated color television receiver of a cathode drive type which can employ a low voltage-proof output transistor.

The above and other objects and features of the invention will appear more fully hereinafter from a consideration of the following description taken in connection with the accompanying drawings wherein one example is illustrated by way of example.

DESCRIPTION OF THE PREFERRED EMBODIMENT

Figure 1:
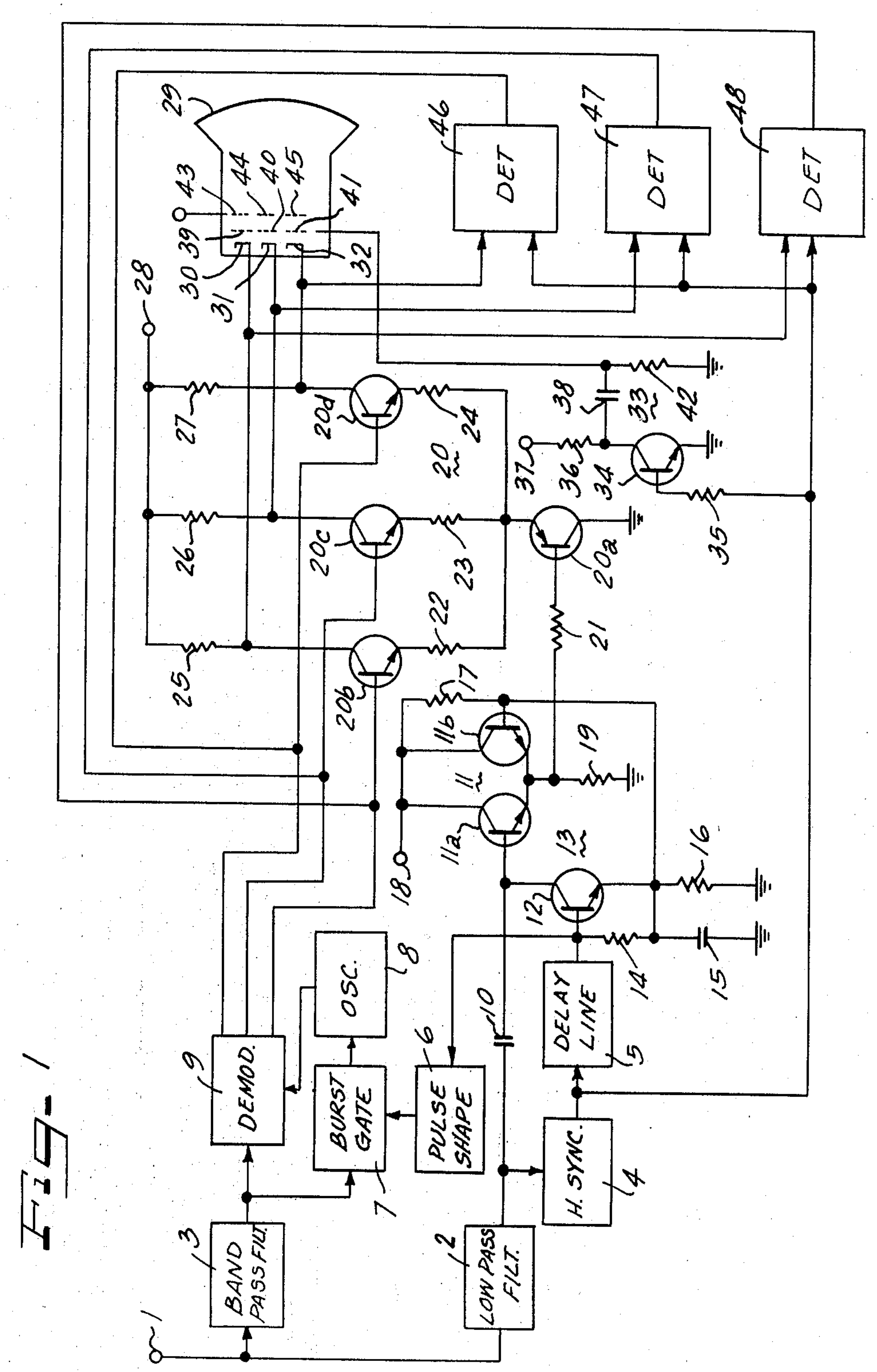
FIG. 1 is a circuit diagram showing one example of a portion of a color television receiver in which this invention is incorporated.
Figure 2A:
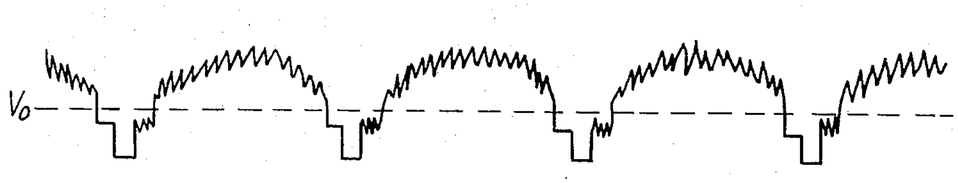
FIGS. 2A–2G are a series of waveform diagrams for use in explaining the circuit of FIG. 1.
Figure 2B:
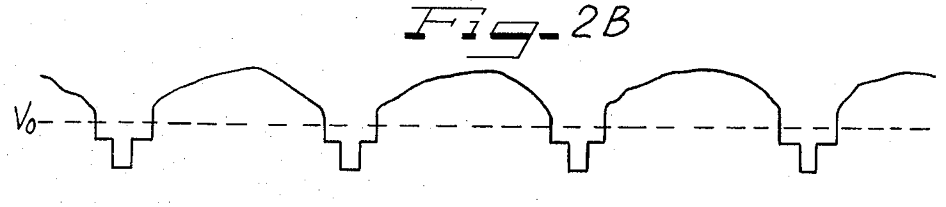
Figure 2C:
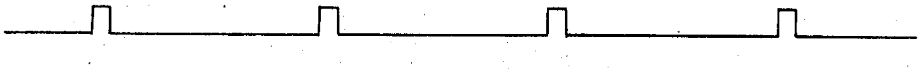
Figure 2D:
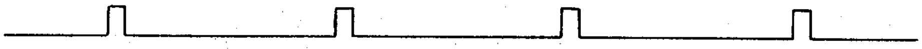

FIG. 1 shows one example of a color television receiver to which this invention is applied. In the figure, a composite color video signal, such as shown in FIG. 2A, is first supplied from a second detector (not shown) to an input terminal 1. This input terminal 1 is connected both to a low pass filter 2 and to a band pass filter 3. The low pass filter 2 has derived therefrom a luminance (Y) signal as shown in FIG. 2B, while the band pass filter 3 has derived therefrom a chrominance signal. The low pass filter 2 is connected at its output terminal to a horizontal synchronizing signal separation circuit 4, from which a horizontal synchronizing pulse as shown in FIG. 2C is derived as its output signal. The horizontal synchronizing signal separation circuit 4 is connected through a delay circuit 5 and a pulse shape circuit 6 to a burst gate circuit 7 to which is supplied a burst gate pulse as depicted in FIG. 2D. The burst gate circuit 7 is further applied with a chrominance signal including a color burst signal from the band pass filter 3. A gated color burst signal derived therefrom is applied to an oscillator 8 to control its oscillation phase. The output signals from the band pass filter 3 and the oscillator 8 are both applied to a color demodulator circuit 9 to produce color difference signals R-Y, B-Y and G-Y, respectively, at its output terminal. The aforesaid arrangement is widely known so that a detailed description will be omitted.

Figure 2E:
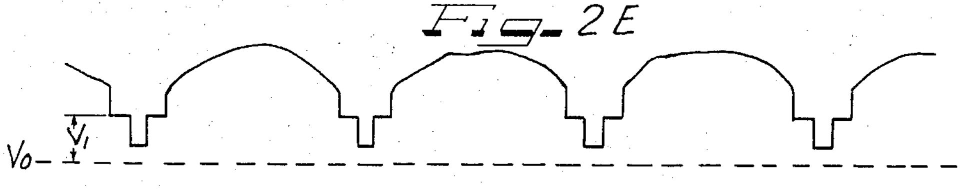
Figure 2F:
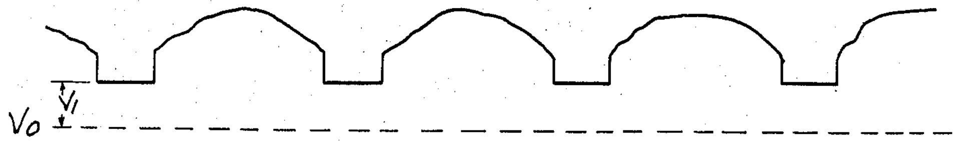

In the present invention, the low pass filter 2 is also connected at its output terminal through a capacitor 10 to a clip circuit 11 consisting of a pair of NPN type transistors 11*a* and 11*b* in order to clip the horizontal synchronizing pulse included in the luminance signal obtained from the low pass filter 2. The pedestal level during the horizontal blanking interval of the luminance signal to be applied to the clip-circuit 11 is previously clamped to a predetermined potential by a clamp circuit 13 consisting of the capacitor 10 and a transistor 12. The base electrode of the transistor 12 forming the clamp circuit 13 is supplied with a delayed horizontal synchronizing pulse from the delay circuit 5 and also is grounded through a series circuit of a resistor 14 and a capacitor 15. The transistor 12 is also connected at its collector electrode to a connection point of the capacitor 10 and the base electrode of the transistor 11*a* and at its emitter electrode through a resistor 16 to the ground and further to a connection point of the resistor 14 and the capacitor 15. The emitter electrode of the transistor 12 is connected through a resistor 17 to a power source terminal 18 to obtain a predetermined potential for clamping and also to the base electrode of the transistor 11*b* to determine the clip level of the clip circuit 11. The respective collector electrodes of the transistors 11*a* and 11*b* are connected to the power source terminal 18, while the respective emitter electrodes thereof are interconnected and further grounded through a resistor 19. The transistor 11*a* is applied at its base electrode with a luminance signal with its pedestal level being clamped to the predetermined potential as shown in FIG. 2E, so that a luminance signal with its pedestal level being clamped to the predetermined potential and with its horizontal synchronizing pulse being clipped as shown in FIG. 2F is derived from the clip circuit 11.

The thus obtained luminance signal, is supplied from a connection point of the interconnected emitter electrodes of the transistors 11*a* and 11*b* through a resistor 21, to the base electrode of a PNP transistor 20*a* forming part of a matrix circuit 20. The transistor 20*a* is then connected at its collector electrode to ground and at its emitter electrode through resistors 22, 23 and 24, respectively, to emitter electrodes of NPN transistors 20*b*, 20*c* and 20*d* which also form part of the matrix circuit 20. Each base electrode of the transistors 20*b*, 20*c* and 20*d* is applied with the color difference signals R-Y, G-Y and B-Y, respectively, from the color demodulator circuit 9. The collector electrodes of the transistors 20*b*, 20*c* and 20*d* are respectively connected through resistors 25, 26 and 27 to a power source terminal 28 and also to the cathode electrodes 30, 31, and 32 of a color picture tube 29. The cathode electrodes 30, 31 and 32 are applied with color signals R, G and B which are obtained from the matrix circuit 20 and include the blanking signals.

For the purpose of providing a sampling pulse to cut off the color picture tube 29, the horizontal synchronizing pulse from the horizontal synchronizing signal separation circuit 4 is supplied through a resistor 35 to the base electrode of an NPN transistor 34 forming a sampling pulse generator 33. The emitter electrode of the transistor 34 is grounded and its collector electrode is connected through a resistor 36 to a power source terminal 37. The sampling pulse derived from the collector electrode of the transistor 34 is applied through a capacitor 38 to the respective first grid electrodes 39, 40 and 41 of the color picture tube 29 in common. This sampling pulse is a negative-going pulse having a peak value sufficient for cutting off the color picture tube 29. The first grid electrodes 39, 40 and 41 are grounded through a resistor 42 at a time of the normal operation so as to be biased at substantially zero volt. While, second grid electrodes 43, 44 and 45 of the color picture tube 29 are biased at substantially 400 volts as being normally performed.

The cathode electrodes 30, 31 and 32 of the color picture tube 29 are respectively connected to detector circuits 46, 47 and 48 and the output terminal of the horizontal synchronizing signal separation circuit 4 is also connected to the detector circuits 46, 47 and 48. The detector circuits 46, 47 and 48 are designed to detect the potential variations of the cathode electrodes caused by the sampling pulse applied thereto for cutting off the color picture tube at the blanking interval of the video signal. Accordingly, these circuits produce control signals which are respectively applied to the base electrodes of the transistors 20*b*, 20*c* and 20*d* to control minimum beam currents of the cathode electrodes 30, 31 and 32 each to be a predetermined value.

Figure 3:
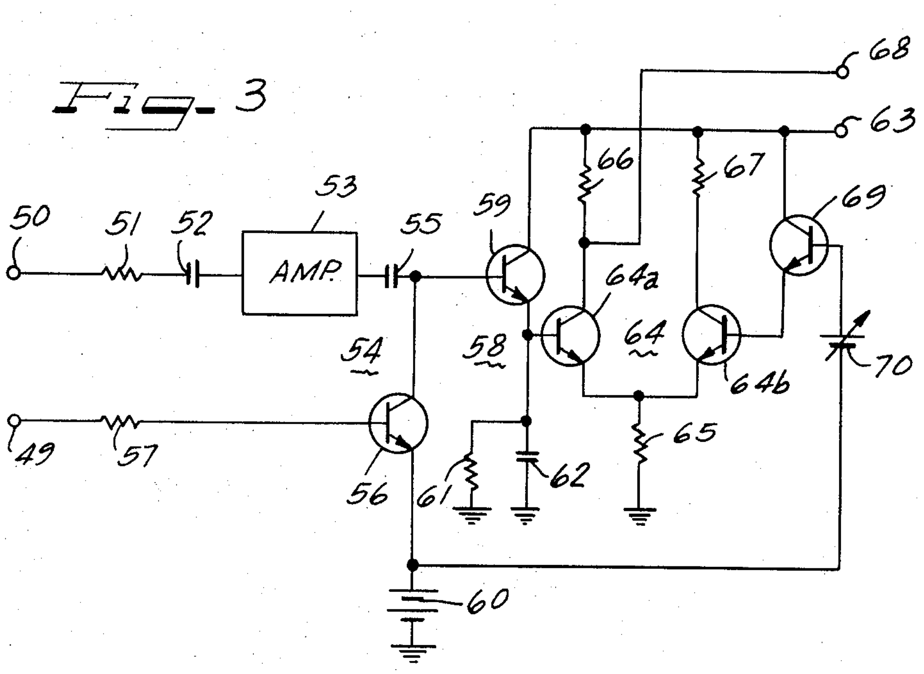
FIG. 3 is a circuit diagram showing one example of a detector circuit for FIG. 1.

The detector circuits 46, 47 and 48 are respectively equal in construction, so that one example of them is illustrated in FIG. 3. For the sake of simplicity, the circuit of FIG. 3 will be explained as the detector circuit 46. In the figure, the output terminal of the horizontal synchronizing signal separation circuit 4 in FIG. 1 is connected to an input terminal 49 and the cathode electrode 32 of the color picture tube 29 in FIG. 1 is connected to an input terminal 50. The input terminal 50 is connected through a series circuit of a resistor 51 and a capacitor 52 to an input terminal of an amplifier circuit 53, the output terminal of which is connected to one end of a capacitor 55 forming a clamp circuit 54. The input terminal 49 is connected through a resistor 57 to a base electrode of an NPN type transistor 56 also forming the clamp circuit 54. The other end of the capacitor 55 is connected to the collector electrode of the transistor 56 and also to a base electrode of a transistor 59 forming a peak detector circuit 58. The emitter electrode of the transistor 56 is connected to a positive electrode of a battery 60 serving as a voltage source, the negative electrode of which is grounded. A clamp pulse applied to the clamp circuit 54 is caused to have a width equal to or smaller than that of the sampling pulse in order to clamp the varied pedestal level produced during a period of time when the sampling pulse is applied to the first grid electrode 41 of the color picture tube 29 in FIG. 1.

The transistor 59 forming the peak detector circuit 58 is grounded at its emitter electrode through a parallel circuit of a resistor 61 and a capacitor 62 and is connected at its collector electrode to a power source terminal 63. Further, the output of the peak detector circuit 58 is applied to a base electrode of an NPN transistor 64*a* forming part of a differential amplifier 64. The emitter electrode of the transistor 64*a* is connected to the emitter electrode of another NPN transistor 64*b* also forming the differential amplifier 64 and is further grounded through a resistor 65. The collector electrodes of the transistors 64*a* and 64*b* are connected respectively through resistors 66 and 67 to the power source terminal 63, while the collector electrode of the transistor 64*a* is connected to an output terminal 68. The base electrode of the transistor 64*b* is connected to the emitter electrode of an NPN transistor 69, which is connected at its collector electrode to the power source terminal 63 and at its base electrode through a variable voltage source 70 to the positive electrode of the battery 60. The output terminal 68 is connected to the base electrode of the transistor 20*d* forming the matrix circuit 20 in FIG. 1.

A description will next be given on the operation of this invention as shown in FIGS. 1 and 3.

Of the composite color video signal applied to the input terminal 1, the chrominance signal obtained from the band pass filter 3 is demodulated at the demodulator circuit 9 to produce the color difference signals which are respectively supplied to the base electrodes of the transistors 20*b*, 20*c* and 20*d* forming the matrix circuit 20 as described above. On the other hand, the luminance signal obtained from the low pass filter 2 has the pedestal level clamped to a potential $V_1$ determined by a dividing ratio of the resistors 16 and 17 at the clamp circuit 13 in order to clip the horizontal synchronizing pulse. Since in this embodiment the clipping level of the clip circuit 11 is also selected to be the same potential as the above clamped level, when the transistor 11*a* is applied at its base electrode with a voltage higher than the aforesaid potential $V_1$, the transistor 11*a* becomes conductive to supply a luminance signal such as shown in FIG. 2F to the base electrode of the transistor 20a forming part of the matrix circuit 20. The clip level may not always be required to be the same potential as the clamp level $V_1$, but may be selected so as to obtain the blanking signal with the horizontal synchronizing pulse being clipped. The clipping of the horizontal synchronizing pulse is caused by the correct detecting of the minimum beam current at the blanking interval of the picture tube 29 by the peak detector circuit 58 of the detector circuit 46. Accordingly, the matrix circuit 20 has derived therefrom the direct current restored color signals R, G and B whose pedestal levels are determined by the direct current voltages transmitted together with the color difference signals from the demodulator 9, the respective color signals R, G and B being respectively supplied to the cathode electrodes 30, 31 and 32 of the picture tube 29.

Figure 2G:
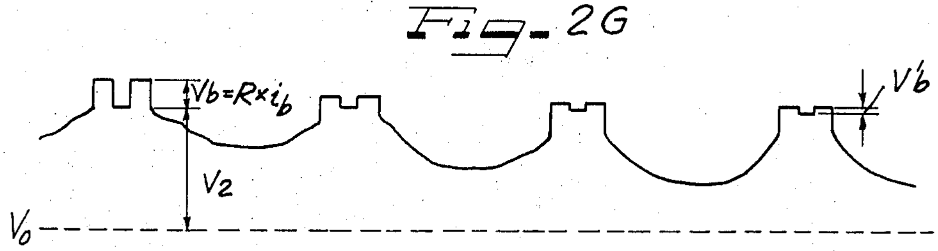

The first grid electrodes 39, 40 and 41 of the picture tube 29 are applied with the sampling pulse from the sampling pulse generator 33. Since this sampling pulse is negative in polarity and has a sufficient peak value to cut off the picture tube 29, the beam currents $i_b$ with the pedestal level of the color signals R, G and B applied from the matrix circuit 20 become zero during the period of time when the sampling pulse is applied and hence the beam currents for the above period will flow through the resistors 25, 26 and 27, respectively. Therefore, a waveform shown in the left side of FIG. 2G is produced at the cathode electrodes 30, 31 and 32 of the color picture tube 29. The interval of a recess located at the central portion of the waveform shown in FIG. 2G is the one at which the sampling pulse is applied. Assuming that the value of the resistor 25 is $R$ ohm, the beam current flowing through the cathode electrode 30 with the pedestal level, that is, at the blanking interval is shown as $i_b = V_b/R$. Currents flowing through the other cathode electrodes 31 and 32 are also determined similarly. In other words, since the $V_b$ is proportional to the minimum beam current, if this potential $V_b$ is selected to be a predetermined voltage the minimum beam current can be determined. For this reason, the cathode electrodes 30, 31 and 32 are connected to the detector circuits 48, 47 and 46.

If a cutoff pulse is not added to the picture tube the waveform shown in FIG. 2G will be flat during blanking interval. In this case, the collector current of the transistor 20b which is determined by the base potential thereof is the sum of beam current and the current which flows through the resistor 25. Once the cutoff pulse is added to the picture tube, the beam current above described will flow through the resistor 25. Namely, the collector current of the transistor 20*b* all flows through the resistor 25 during cutoff. Consequently, the waveform shown in FIG. 2G has a hollow. This comparison is achieved at the detector circuit 46 including a differential amplifier 64. Supposing the variable voltage source 70 is non-existent, potential $V_2$ of the battery 60 is always supplied to one input terminal of the differential amplifier 64. On the other hand, the pedestal level of the blanking interval is held at the condensor 62 and is supplied to the other input terminal of the differential amplifier 64 until the next blanking interval. Because the cutoff potential is clamped to the potential $V_2$, the potential $Vb$ in FIG. 2G is detected at the differential amplifier 64 all the time and the D.C. error signal is always obtained. In response to the error signal, the beam current is controlled as shown in FIG. 2G from left to right by the feed back loop.

The control of the minimum beam current may be somewhat differently stated and to this end reference will be made to the detector circuit 46, for example. At first, of the video signal extracted from the cathode electrode 32 as shown in FIG. 2G, a portion, at the interval being applied with the sampling pulse, is clamped to the potential $V_2$ of the battery 60. While the potential of the pedestal level excepting the aforesaid interval is charged in the capacitor 62 of the peak detector circuit 58 until the next blanking time. If the variable voltage source 70 is not employed and hence the positive electrode of the battery 60 is directly connected to the base electrode of the transistor 69, the potential difference between the two input terminals of the differential amplifier 64 becomes $V_b$ as the gain of the amplifier circuit 53 is one and a current based upon the potential difference $V_b$ flows through the transistors 64*a* and 64*b* to produce a direct current potential at the output terminal 68 of the detector circuit 46 in accordance with the above current. Further, the output signal from the output terminal 68 is fed back to the base electrode of the transistor 20*d*, thereby to control the base biasing voltage of the transistor 20*d* so that the potential difference $V_b$ becomes zero, that is, the minimum beam current is caused to be zero. But, in this embodiment the variable voltage source 70 is employed as shown in FIG. 3, thereby to set the potential $V_b$ to be a voltage $V_b'$ at the voltage source 70. As a result, the minimum beam current can be controlled to be a value determined by $V_b'/R$, which is shown by a waveform at the right side of FIG. 2G. The foregoing is also applicable to the detector circuits 47 and 48. The video signal is formed based on its pedestal level as before described, so that the beam current flows correctly in response to the video signal by setting the beam current at the pedestal level. Further, the voltages across the variable voltage sources 70 provided in the respective detector circuits 46, 47 and 48 are established to be respectively different values as the occasion demands according to luminous characteristics of fluorescent members for the respective color signals R, G and B of the color picture tube 29, its uneven construction or the like, and hence a white having a desirable color temperature can be set. Therefore, according to the present invention, even though there occur the unbalance of direct current levels in three systems of the demodulator circuit 9, there occur the unbalance of three systems of the matrix circuit 20 or the like, there be a variation of direct current level with respect to temperature variation, and/or a secular variation of the color picture tube 29, it is possible to display a color image which is always stable and in good color balance. Accordingly, this invention is suitable for use in the color television receiver having integrated circuits. The invention is also applicable to a black and white television receiver.

Figure 4:
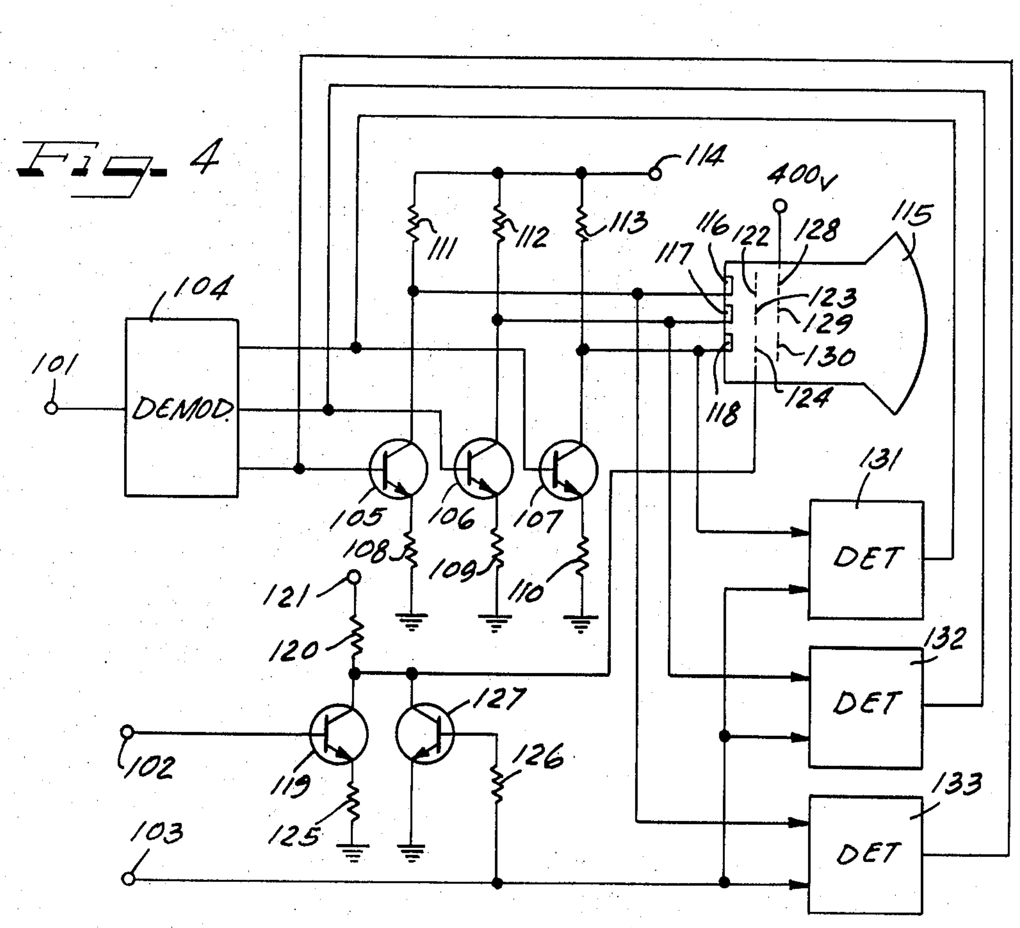
FIG. 4 is a circuit diagram showing another embodiment of this invention.
Figure 5A:
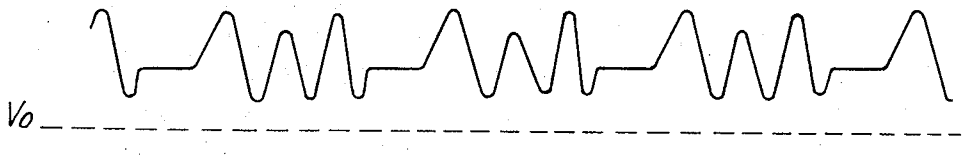
FIG. 5 is a series of waveform diagrams for use in explaining the circuit of FIG. 4.

FIG. 4 illustrates another example according to this invention. In this example, a chrominance signal derived from a band pass filter (not shown) is applied to an input terminal 101, a direct current restored luminance signal derived from a low pass filter (not shown) is applied to an input terminal 102, and a horizontal synchronizing pulse derived from a horizontal synchronizing signal separation circuit (not shown) is applied to an input terminal 103. The chrominance signal from the input terminal 101 is applied to a color demodulator circuit 104 to produce three color difference signals R-Y, B-Y and G-Y, respectively, which are shown in FIG. 5A. These output signals are respectively applied to base electrodes of transistors 105, 106 and 107. The emitter electrodes of the transistors 105, 106 and 107 are grounded through resistors 108, 109 and 110, respectively, while the collector electrodes thereof are connected to a power source terminal 114 through resistors 111, 112 and 113, respectively, and also the cathode electrodes 116, 117 and 118, respectively, of a color picture tube 115.

Figure 5B:
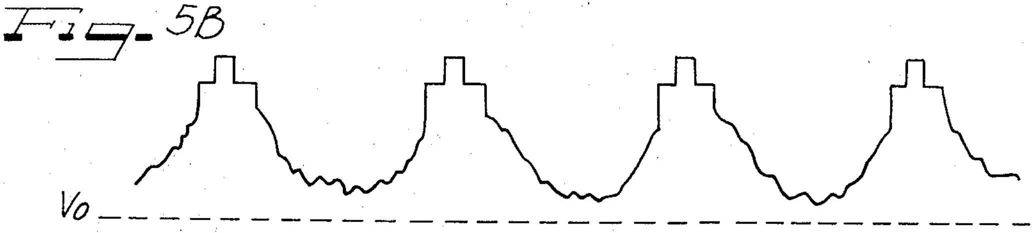

Meantime, the luminance signal as shown in FIG. 5B applied to the input terminal 102 is applied to a base electrode of a transistor 119. The collector electrode of the transistor 119 is connected through a resistor 120 to a power source terminal 121 and also the first grid electrodes 122, 123 and 124 of the color picture tube 115 in common, while the emitter electrode thereof is grounded through a resistor 125.

Figure 5C:
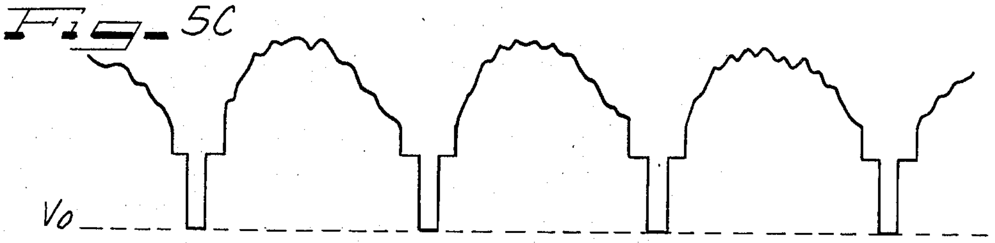
Figure 5D:
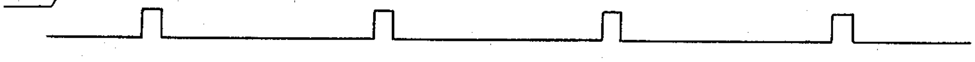

Furthermore, the horizontal synchronizing pulse applied to the input terminal 103 is fed to a base electrode of a transistor 127 through a resistor 126. The emitter electrode of the transistor 127 is grounded and the collector electrode thereof is connected to the first grid electrodes 122, 123 and 124 of the color picture tube 115 in common with the collector electrode of the transistor 119. The second grid electrodes 128, 129 and 130 of the color picture tube 115 are impressed with a bias voltage of about 400 volts in common. Accordingly, the first grid electrodes 122, 123 and 124 of the color picture tube 115 are applied with the luminance signal such that the horizontal synchronizing pulse is extended to the ground potential as shown in FIG. 5C. This extended horizontal synchronizing pulse is served as the sampling pulse to cut off the color picture tube 115.

Figure 5E:
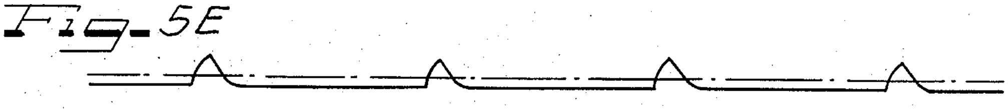
Figure 5F:
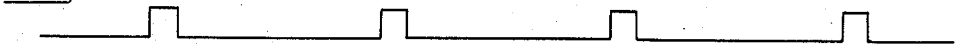
Figure 5G:
Figure 5H:
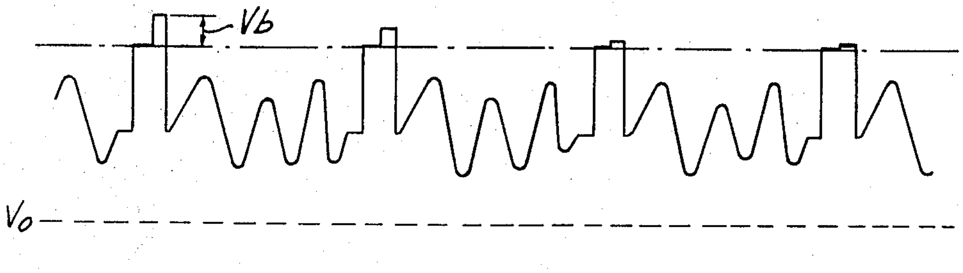
Figure 6:
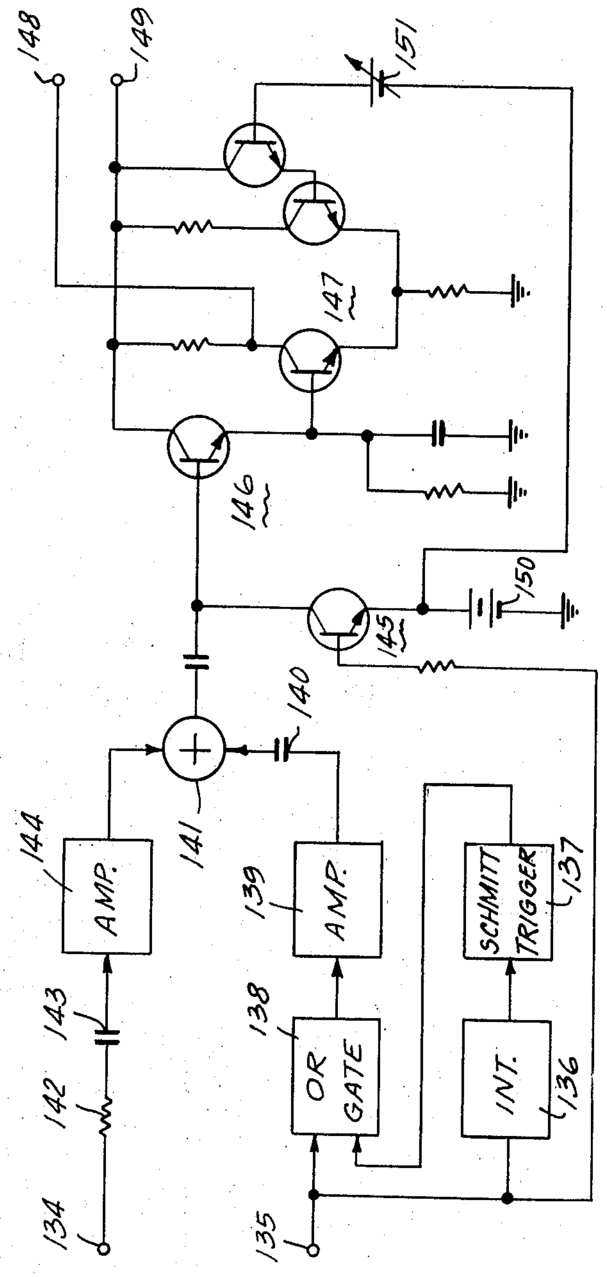
FIG. 6 is a circuit diagram showing one example of a detector circuit which may be used in FIG. 4.

In this example, too, three detector circuits 131, 132 and 133 are provided similarly as the aforesaid example. As shown in FIG. 6, these circuit constructions are the same as that of FIG. 3 except for one part. In FIG. 6, the cathode electrode of the color picture tube 115 in FIG. 4 is connected to an input terminal 134 and the horizontal synchronizing pulse (FIG. 5C) from the input terminal 103 applied to an input terminal 135. The horizontal synchronizing pulse is further supplied to an integration circuit 136 to obtain an integrated waveform shown in FIG. 5E. The output of the integration circuit 136 is supplied to a Schmitt trigger circuit 137, in which a wave shaping is performed with a level shown by a dash-dot line in FIG. 5E to derive therefrom an output shown in FIG. 5F. This output and the horizontal synchronizing pulse are applied to an OR gate circuit 138 to derive therefrom a pulse shown in FIG. 5G, which is then applied through a pulse amplifier circuit 139 and a capacitor 149 to an adder circuit 141. On the other hand, a signal from the input terminal 134 is applied through a resistor 142, a capacitor 143, and an amplifier 144 to the adder circuit 141. The output signal from the adder circuit 141 is supplied to a clamp circuit 145 to obtain a waveform shown in FIG. 5H. The construction and operation of the remaining part are the same as those of the circuit in FIG. 3, that is, a peak detector circuit 146 and a differential amplifier 147 are provided. An output terminal 148 is derived from the differential amplifier 147. The output signal from the output terminal 148 is fed back to the output terminal of the color demodulator circuit 104. Reference numeral 149 designates a power source terminal.

In this example, the signal applied to the cathode electrode of the color picture tube 115 is the color difference signal, whose direct current level at the banking interval is positioned substantially at the center of the signal, as depicted in FIG. 5A. For this reason, the level is shifted only during the pulse interval shown in FIG. 5G so that the beam current can be correctly detected irrespective of the color difference signal during the blanking interval at the peak detector circuits 146 of the detector circuits 131, 132 and 133. The shifting amplitude can be determined by the amplification degree of the amplifier circuit 139. Of the portion shifted in level as shown in FIG. 5H, the level of the left half interval is the potential of the battery 150 of the clamp circuit 145 and the level of the right half interval is the potential at the blanking interval in which the beam current flows. A value obtained by dividing the potential difference $V_b$ between the above two intervals by a resistance value $R$ of, for example, the resistor 111, is the beam current $i_b$ at the blanking interval. It is the same as in the example of FIG. 3 that the amount of this current $i_b$ can be controlled by the variable voltage source 151.

The above description has been made with reference to two embodiments of the invention. It will be apparent, however, that a number of variations or applications can be effected. For example, the minimum beam current may be detected at the vertical blanking interval. As another example, a sampling pulse may be applied at the horizontal blanking interval (or the vertical blanking interval) while a beam current at its pedestal level may be detected at the vertical blanking interval (or the horizontal blanking interval). Further, a sampling pulse may be applied to the second electrodes of a color picture tube.

I claim as my invention:

1. A beam current control system for a picture tube comprising a picture tube including at least one cathode electrode and a control electrode, means for applying a video signal to said cathode electrode, means for applying a pulse to said control electrode to cut off said picture tube, differential amplifier means for detecting the difference between a potential of said cathode electrode during each blanking interval and a potential of said cathode electrode when said picture tube is cut off, means for deriving a control signal from said detected difference and means for controlling a beam current of said picture tube in response to said control signal.

2. A beam current control system for a picture tube according to claim 1, wherein said control signal producing means comprises means for clamping a pedestal level derived from said video signal at a cut-off time of the picture tube to a predetermined potential and which includes means for detecting a peak value of said video signal.

3. A beam current control system for a picture tube according to claim 2, wherein said control signal producing means further includes a variable voltage source for presetting a minimum value of said beam current.

4. A beam current control system for a television picture tube whose picture is blanked during retrace comprising a picture tube having at least one cathode electrode and at least one grid electrode, means for applying a chrominance signal to said cathode electrode, means for applying a pulse to said control electrode to cut off said picture tube, means for producing a control signal in response to the difference between the potential of said cathode at blanking and a reference potential developed during cut-off, and means for controlling the beam current of said picture tube in response to said control signal.

5. A beam current control system for a picture tube according to claim 4 which includes means for reducing said difference between said compared signals to a predetermined minimum value.

6. A beam current control system for a television picture tube whose picture is blanked during retrace comprising a picture tube having at least one electrode and at least one grid electrode, means for applying a chrominance signal to said cathode electrode, means for applying a pulse to said control electrode to cut off said picture tube, means for comparing the cathode potential during blanking with the cathode potential during cut-off, means developing an error signal from said comparison, and means for utilizing said error signal to reduce the difference between said compared signals to a predetermined minimum level.

* * * * *